UNITED STATES PATENT OFFICE.

THOMAS EDWARDS, OF MILTON, MASSACHUSETTS.

ADHESIVE CEMENT AND PROCESS OF MAKING SAME.

1,374,992.     Specification of Letters Patent.     Patented Apr. 19, 1921.

No Drawing.     Application filed July 27, 1917. Serial No. 183,111.

*To all whom it may concern:*

Be it known that I, THOMAS EDWARDS, a citizen of the United States, and resident of Milton, in Norfolk county, Massachusetts, have discovered a new and useful Adhesive Cement and Process of Making Same, of which the following is a specification.

A principal object of the invention is to provide a cement which may be used for certain purposes as a substitute for a pure-rubber-base cement, and which shall be cheaper, and for many purposes, superior to a pure-rubber cement. To this end, the invention provides for combining with rubber, dextrin, or dextrin and glucose, in suitable proportions, together with suitable solvents for certain of the solid components, especially for the rubber and dextrin, producing a uniform, more-or-less fluid, elastic, adhesive paste of superior quality, at a relatively low cost.

One example of an important use for which my cement is adapted is in the fabrication of leather shoes, in which the cement is used to secure various parts of the shoe together, in place of pure-rubber or other cement of greater cost or inferior qualities. My cement is, however, adaptable to many other uses.

The process of making the cement consists in preparing crude rubber by grinding, mixing or otherwise; adding to a suitable quantity of this rubber, suitable quantities of dextrin and glucose, with or without coloring material, adding naphtha (or other suitable rubber-solvent) to dissolve the rubber, and water to dissolve the dextrin; and treating the whole in suitable "digesting," mixing or churning apparatus, until the materials are uniformly mixed.

In some cases the naphtha may be first added, and the materials mixed, and the water then added, and the materials further mixed. Otherwise, the rubber and dextrin may be mixed or ground together, the naphtha then added, and then the water added. In this way the rubber and dextrin are intimately combined in a mechanical way and the addition of naphtha dissolves the rubber, the dextrin being inert or inactive in the composition until the water is added, whereupon the dextrin is acted upon by the water and dissolved and united with the already dissolved rubber into an intimate mixture.

One suitable formula for a cement adapted for shoe-manufacture is the following:

| | | |
|---|---|---|
| Rubber | 10 | lbs. |
| Dextrin | 10 | " |
| Glucose | 2.5 | " |
| Naphtha | 14 | gals. |
| Water | 1.5 | " |

The cement made by this formula, and by the above process, is much heavier, per unit volume, than ordinary rubber cement, spreads smoothly, covers evenly, and is very easy to apply.

The relative quantities of materials may be varied greatly, within the invention, for different purposes. The dextrin may vary from 15% to 300% of the rubber-content, and the glucose may vary, usually maintaining, however, a more-or-less constant relation to the dextrin-content, say 25% of the amount of dextrin.

One formula, representing an approach to the maximum ratio of dextrin, is the following:

| | | |
|---|---|---|
| Rubber | 8 | lbs. |
| Dextrin | 24 | " |
| Glucose | 3 | " |
| Naphtha | 7.5 | gals. |
| Water | 7.5 | " |

Another formula, representing an approach to the minimum quantity of dextrin, is:

| | | |
|---|---|---|
| Rubber | 8 | lbs. |
| Dextrin | 1.2 | " |
| Glucose | .3 | " | with naphtha and water in suitable quantities to dissolve the rubber and dextrin.

From the above formula, the .3 glucose can be omitted in some instances, and a satisfactory paste be produced.

Dextrin and glucose produced from yellow corn are suitable for my cement, but of course I do not limit myself to materials of that origin.

The completed cement, whether kept in bulk (with suitable protection), or when applied and used as an adhesive, is stable and free from injurious chemical action.

I claim:

1. A cement consisting of rubber, dextrin, a fluid solvent for the rubber, and water as a solvent for the dextrin.

2. A cement consisting of rubber and a fluid solvent therefor, dextrin, and glucose, and water as a solvent for the dextrin and glucose.

3. The process of making adhesive cement, consisting of combining rubber, dextrin and glucose, adding a fluid solvent for the rubber and water as a solvent for the dextrin and glucose, and mixing to form a paste.

4. The process of making adhesive cement, consisting of comminuting rubber, adding thereto dextrin to form a mixture, adding a liquid solvent for the rubber, and then adding water as a solvent for the dextrin, and mixing to form a paste.

THOMAS EDWARDS.